(12) United States Patent
Egeland et al.

(10) Patent No.: US 8,748,524 B2
(45) Date of Patent: Jun. 10, 2014

(54) GLUE AND COATING FOR REFRACTORY MATERIALS AND CERAMICS

(75) Inventors: Bjorn Egeland, Slemmestad (NO); Alf Håberg, Kristiansand (NO); Johan Arnold Johansen, Kristiansand (NO); Stian Madshus, Kristiansand (NO)

(73) Assignee: Elkem Carbon AS, Oslo (NO)

( * ) Notice: Subject to any disclaimer, the term of this patent is extended or adjusted under 35 U.S.C. 154(b) by 210 days.

(21) Appl. No.: 13/272,306

(22) Filed: Oct. 13, 2011

(65) Prior Publication Data
US 2012/0088876 A1   Apr. 12, 2012

Related U.S. Application Data

(63) Continuation-in-part of application No. PCT/NO2010/000158, filed on Apr. 30, 2010.

(30) Foreign Application Priority Data

May 11, 2009 (NO) .................................. 20091852

(51) Int. Cl.
*C09J 171/14* (2006.01)
*C09J 161/06* (2006.01)
*C08K 3/14* (2006.01)
*C08K 3/34* (2006.01)

(52) U.S. Cl.
USPC ............................ 524/439; 524/443; 524/594

(58) Field of Classification Search
USPC .................................. 524/443, 594, 512, 439
See application file for complete search history.

(56) References Cited

U.S. PATENT DOCUMENTS

| | | | | |
|---|---|---|---|---|
| 4,378,450 A | * | 3/1983 | Ema et al. ...................... | 525/139 |
| 4,952,533 A | | 8/1990 | Hongu | |
| 5,474,849 A | | 12/1995 | Graef et al. | |
| 7,319,131 B2 | * | 1/2008 | Swedo et al. ................. | 528/129 |
| 2007/0267789 A1 | | 11/2007 | Mittag et al. | |
| 2008/0131665 A1 | | 6/2008 | Suyama et al. | |

FOREIGN PATENT DOCUMENTS

| | | |
|---|---|---|
| CN | 101639322 A | 2/2010 |
| EP | 0 356 800 A1 | 3/1990 |
| JP | 54134744 A | 10/1979 |
| JP | 57111283 A * | 7/1982 |
| JP | 2008274101 A | 11/2008 |

OTHER PUBLICATIONS

Full English-language translation of JP 57-111283 A, Jul. 10, 1982.*

* cited by examiner

*Primary Examiner* — Vickey Nerangis
(74) *Attorney, Agent, or Firm* — Lucas & Mercanti, LLP

(57) ABSTRACT

The present invention relates to a heat crucible glue or coating for use in connection with refractory materials and ceramics. The glue or coating comprises 25 to 50 weight % silicon powder, 5 to 20 weight % SiC powder, 20 to 60 weight % formaldehyde resin or polyfurfuryl alcohol and 10 to 30 weight % of an organic solvent.

6 Claims, 1 Drawing Sheet

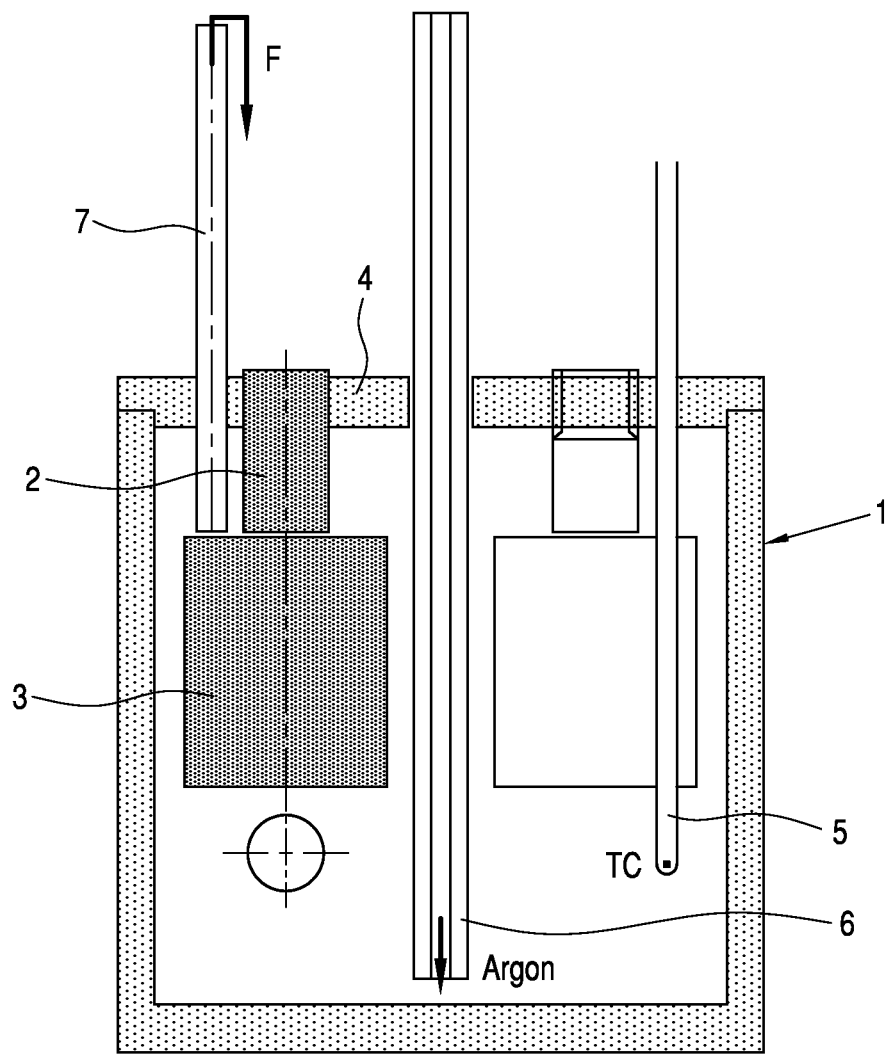

US 8,748,524 B2

GLUE AND COATING FOR REFRACTORY MATERIALS AND CERAMICS

CROSS-REFERENCE TO RELATED APPLICATION

This application is a Continuation In Part of International application PCT/NO2010/000158 filed Apr. 30, 2010, which in turn claims the benefit of priority from NO 20091852 filed May 11, 2009, the contents of each of which are incorporated herein by reference.

FIELD OF INVENTION

The present invention relates to a glue and a coating for refractory materials and ceramics, such as carbon materials, silicon nitride, silicon carbide and quartz.

TECHNICAL BACKGROUND

It is known a plurality of glues for gluing refractory materials and ceramics such as carbon, materials, silicon nitride, silicon carbide and quartz which are to be used at high temperatures. From U.S. Pat. No. 5,474,849 it is known a glue for carbon components. The glue comprises a thermoset polysilazen polymer, 20 to 50% by weight based on the weight of polymer of a ceramic powder which can be SiC, 10-40% by weight based on the weight of polymer of Si-powder and 5-15% by weight based on the weight of polymer of carbon powder.

It has however been found that this type of glue is not suitable for carbon material, silicon nitride, silicon carbide and quartz that is to be used in furnaces, moulds, crucibles or details for such intended to be contact with molten silicon. It is important that glue used in connection with parts does not contaminate the molten silicon which is in contact with the mentioned furnaces, moulds, crucibles or details for such. This is particularly important in connection with treatment of high purity silicon which is to be used for the production of solar cells. It is further important that the glue joints are not wettable by molten silica.

DESCRIPTION OF THE INVENTION

By the present invention it is provided a glue and coating which is easy to use, has a good strength at high temperatures, is not wettable by molten silicon and that can be stored for a long time. The glue and coating further has the surprising effect that it looses its strength during cooling from high temperatures and down to below 1000° C. This effect is particularly useful when the glue is used for gluing together moulds made from separate sheets of for instance silicon nitride, quartz or graphite used for directional solidification of molten silicon. During cooling of silicon a solid phase transformation takes place which results in a volume increase and may cause failure of the moulds. By the use of moulds made from separate sheets glued with the glue according to the present invention the glue will at the temperature where the phase transformation takes place have a low strength and the moulds will therefore crack in the glue layers while the individual sheets not will be damaged. The sheets can therefore be reused for making new moulds.

The present invention thus relates to a heat curable glue or coating for use in connection with carbon materials, silicon nitride, silicon carbide and quartz, which glue or coating comprises about 25 to 50% by weight of silicon powder, about 5 to 20% by weight of silicon carbide powder, about 20 to 60% by weight of phenol formaldehyde resin or polyfurfuryl alcohol and about 10 to 30% by weight of an organic solvent.

The silicon powder has a particle size of about below 100 μm and $d_{50}$ of about 15 μm.

The silicon carbide powder has a particle size of about below 100 μm and $d_{50}$ of about 30 μm.

While there is no specific purity level for the silicon powder and silicon carbide, those of ordinary skill in the art would appreciate that if the glued parts or coating are used in connection with crucibles or moulds for high purity silicon of solar cell grade, the content of boron and phosphorous should be as low as possible.

According to a preferred embodiment the organic solvent is selected among monoethylene glycol, diethylene glycol and triethylene glycol. The preferred organic solvent is monoethylene glycol.

The solvent is added in an amount sufficient to obtain a suitable viscosity of the glue or coating. Suitable viscosity of the glue or coating is that where the glue or coating has a viscosity that makes it possible to apply the glue on the parts. Viscosity is dependent on the temperature.

According to a preferred embodiment the glue or coating comprises about 35 to 45% by weight of silicon powder, about 8 to 18% by weight of silicon carbide powder, about 25 to 35% by weight of formaldehyde resin or polyfurfuryl alcohol and about 15 to 25% by weight of organic solvent.

According to another preferred embodiment the glue or coating contains a curing agent in order to lower the polymerization temperature for the formaldehyd resin or the polyfurfuryl alcohol. The curing agent is between about 5 and about 20% by weight of resin in the mixture. The curing agent is preferably hexamine, but aluminium phosphate and acid such as sulfuric acid, paratoluene sulphonic acid (PTS), PTS neutralized with urea and para-toluene sulphonic acid ethyl ester (PTSEE) can also be used.

The glue or coating according to the present invention is in liquid state at room temperature and can be stored for a long time. Graphite should not be present in the glue or coating.

When using the glue or coating not containing curing agent, the organic solvent will be volatilized at 150 to 290° C. and polymerization of formaldehyde resin and polyfurfuryl alcohol will take place within a temperature range between 250° C. to 400° C. whereby a solid structure is being formed. If a curing agent is added the polymerization process will start at lower temperature.

During further heating it will at about 700° C. remain a carbon structure consisting of the remains of the formaldehyde resin or polyfurfuryl alcohol. The strength of the glue will in this temperature range be higher than 20 MPa. By further temperature increase a reaction will take place between the carbon structure and the silicon powder in the glue and with continued heating to a temperature above 1413° C. the Si powder will melt and react with carbon to SiC. If the temperature increase is slow, the reaction between Si powder and carbon will, however, take place in solid state.

The heating of the glued parts should be done in inert or reducing atmosphere, particularly at higher temperature where a carbon structure forms from the remains of the formaldehyde resin or polyfurfuryl alcohol. The carbon structure may be oxidized if oxygen is present.

When using the glue for gluing of carbon lids for smelting crucibles the glue according to the invention has shown to create a seal against contact with molten silicon. During cooling of the smelting crucible after having been used for smelting of silicon the strength of the glue disappears and the parts glued together can be released from each other without resistance. The glue according to the invention thus maintains its strength as long as the glued parts are kept at high temperature.

One of the unique characteristics of the glue according to the invention is that it turns to a powder upon cooling to room temperature. The glue according to the invention, for example, exhibits adhesive forces of 10 Kg and above at 1000° C., and 0 Kg after heating to above 1000° C. and cooling down at room temperature.

The thickness of the glue of the adhesive layer between the different parts should be as thin as possible. For example, after the glue has been applied, the parts to be glued are pressed together and any surplus glue will be squeezed out. The desired thickness of the coating layer can be varied according to the desires of the skilled artisan. For example, the coating layer is used to fill rough spots and to smooth the surface of the sheets used to form the mould.

Test with use of the coating in graphite moulds for solidification of molten silicon has shown that the coating provides a layer which fills pores and cavities and totally seals against penetration of silicon into the walls of the graphite mould.

After cooling of the silicon and removal of the silicon ingot the remains of the coating could be brushed away as a dust-like powder and the mould could again be coated with the coating according to the invention. The dust-like powder cannot be reused.

The glue according to the invention can also be used for gluing moulds for use in directional solidification of silicon where the moulds consists of a bottom sheet and side sheets that are glued together. The glue seals cavities and surface roughness in the sheets and the requirement to the surface finish of the sheets can thus be lowered. After solidification and cooling the glue will as mentioned above loose its strength and the sheets can thus be used for making a new mould. The sheets that are glued can be made of carbon material such as prebaked carbon sheets or graphite sheets, silicon nitride sheets or quartz sheets.

SHORT DESCRIPTION OF THE DRAWING

FIG. 1 shows a set-up for testing of strength of graphite parts glued with glue according to the invention.

DETAILED DESCRIPTION OF INVENTION

Example

FIG. 1 shows a set-up for testing of the strength of glue for graphite parts glued with glue according to the invention. The glue had the following composition:

38 weight % silicon powder, 12 weight % silicon carbide powder, 28 weight % formaldehyde resin, 18% monoethylene glycol and 4 weight % hexamin.

On FIG. 1 there is schematically shown a graphite crucible 1 placed in an induction furnace (not shown). Three samples were prepared consisting of an upper graphite cylinder 2 having a diameter of 24 mm being glued to a lower graphite cylinder 3 by means of the glue according to the invention. The cylinder 3 has a greater diameter than the graphite cylinder 2. The three glued samples were screwed to the lower side of lid 4 for the crucible 1. The temperature in the crucible was measured by means of a thermocouple 5 and the atmosphere in the crucible was kept inert by addition of argon via a pipe 6. A ceramic rod 7 was inserted through the lid 4 in order to exert a force to the part 3 of the samples. The ceramic rod 7 was connected to a feather-weight of 20 kg.

The crucible was heated according to the following program:
20-1000° C.: 20 minutes
1000-1600° C.: 60 minutes
Holding time at 1600° C.: 60 minutes
Cooling from 1600° C. to 1000° C.: 60 minutes
The furnace was thereafter shut-off and the samples were slowly cooled to room temperature.

The samples 1-3 was loaded with a force of 20 kg at different temperatures and different times. The results are shown in Table I.

TABLE 1

| Temperature ° C. | Time from start minutes | Sample 1 kg | Sample 2 kg | Sample 3 kg |
| --- | --- | --- | --- | --- |
| 1350 | 35 | >20 | | |
| 1500 | 50 | >20 | | |
| 1600 | 60 | 12 | | |
| 1600 | 120 | | >20 | >20 |
| 1350 | 145 | | 18 | >20 |
| 1000 | 180 | | | >20 |
| Room temp | | | | No strength |

The results shown in Table 1 show that Sample 1 which was loaded with a weight of 20 kg during the heating period had a good strength up to 1600° C.

Sample 2 was loaded with a weight of 20 kg after having been kept at 1600° C. for 60 minutes and had a good strength at that temperature. Also after been cooled to 1350° C. Sample 2 showed a good strength.

Sample 3 was loaded with a weight of 20 kg after having been kept at 1600° C. for 60 minutes and during cooling to 1350° C. and during further cooling to 1000° C. The results show that the strength of the glue was very good at these temperatures. By further cooling to room temperature the part 3 of Sample 3 fell off the upper part 2 of the Sample.

The results from these examples show that the glue according to the invention has a very good strength during heating to 1600° C. and maintains it strength during cooling to a temperature below 1000° C., while the strength thereafter is reduced.

The invention claimed is:

1. A heat curable glue or coating for use in connection with refractory materials and ceramics consisting:
    about 25 to 50% by weight of silicon powder;
    about 5 to 20% by weight of silicon carbide powder;
    about 20 to 60% by weight of phenol formaldehyde resin or polyfurfuryl alcohol; and
    about 10 to 30% by weight of an organic solvent,
    wherein the heat curable glue or coating turns to powder upon cooling to room temperature after heating.

2. The glue or coating according to claim 1, wherein the organic solvent is selected from the group consisting of monoethylene glycol, diethylene glycol and triethylene glycol.

3. The glue or coating according to claim 1, wherein the glue or coating consists about 35 to 45% by weight of silicon powder, about 8 to 18% by weight of silicon carbide powder, about 25 to 35% by weight of formaldehyde resin or polyfurfuryl alcohol and about 15 to 25% by weight of organic solvent.

4. A heat curable glue or coating for use in connection with refractory materials and ceramics consisting:
    about 25 to 50% by weight of silicon powder;
    about 5 to 20% by weight of silicon carbide powder;

about 20 to 60% by weight of phenol formaldehyde resin or polyfurfuryl alcohol;

about 10 to 30% by weight of an organic solvent; and a curing agent in order to lower the polymerization temperature for the formaldehyde resin or the polyfurfuryl alcohol, wherein the heat curable glue or coating turns to powder upon cooling to room temperature after heating.

5. The glue or coating according to claim 4, wherein the curing agent is hexamine, aluminium phosphate, para-toluene sulfonic acid ethyl ester, or an acid.

6. The glue or coating according to claim 5, wherein the acid is sulfuric acid, or para-toluene sulfonic acid neutralized with urea.

* * * * *